(12) United States Patent
Choi et al.

(10) Patent No.: US 7,644,418 B2
(45) Date of Patent: Jan. 5, 2010

(54) OPTICAL DISK DRIVE COMPRISING DUST REMOVING APPARATUS

(75) Inventors: Myung-ryul Choi, Seoul (KR); Young-won Lee, Suwon-si (KR); Jae-soo Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/187,681

(22) Filed: Aug. 7, 2008

(65) Prior Publication Data
US 2009/0013338 A1   Jan. 8, 2009

Related U.S. Application Data

(62) Division of application No. 10/983,725, filed on Nov. 9, 2004, now Pat. No. 7,441,256.

(30) Foreign Application Priority Data

Apr. 14, 2004   (KR) ................. 2004-25686

(51) Int. Cl.
*G11B 17/03* (2006.01)
(52) U.S. Cl. .................................... 720/648
(58) Field of Classification Search ........... None
See application file for complete search history.

(56) References Cited

U.S. PATENT DOCUMENTS 5,086,422 A *   2/1992   Hagiya et al. ............... 720/648
6,246,654 B1    6/2001   Omori et al.
6,426,932 B2    7/2002   Omori et al.
6,567,361 B1    5/2003   Ohmori
6,646,974 B2   11/2003   Takizawa et al.
6,650,609 B2   11/2003   Omori et al.
2004/0004928 A1  1/2004   Choi

FOREIGN PATENT DOCUMENTS

| CN | 1203419 A | 12/1998 |
|---|---|---|
| CN | 1467736 A | 1/2004 |
| JP | 10-162565 | 6/1998 |
| JP | 2000-11510 | 1/2000 |
| JP | 2003-157640 | 5/2003 |
| KR | 2002-0059532 | 7/2002 |
| KR | 2003-0063984 | 7/2003 |

OTHER PUBLICATIONS

U.S. Appl. No. 10/983,725, filed Nov. 9, 2004, Myung-ryul Choi, Samsung Electronics Co., Ltd. Suwon-si, Republic of Korea.
First Office Action issued Sep. 21, 2007 in the corresponding Chinese Application No. 200510064061.5.

* cited by examiner

*Primary Examiner*—Mark Blouin
(74) *Attorney, Agent, or Firm*—Staas Halsey LLP

(57) ABSTRACT

An optical disk drive, which includes a main frame, an upper case coupled to an upper portion of the main frame, a tray slidably installed on the main frame, having a door, and adapted to carry a disk, and a front panel coupled to a front end portion of the main frame and having an aperture through which the tray passes, including an air discharging passage between the main frame and the front panel to discharge air and dust introduced into the optical disk drive through a gap between the door and the front panel to an outside of the optical disk drive.

3 Claims, 8 Drawing Sheets

OPTICAL DISK DRIVE COMPRISING DUST REMOVING APPARATUS

CROSS-REFERENCE TO RELATED APPLICATION

This is a divisional application of application Ser. No. 10/983,725 filed Nov. 9, 2004 now U.S. Pat. No. 7,441,256 and claims the priority of Korean Patent Application No. 2004-25686, filed on Apr. 14, 2004, in the Korean Intellectual Property Office, the disclosure of which is incorporated herein by reference.

BACKGROUND OF THE INVENTION

1. Field of the Invention

The present invention relates to an optical disk drive, and more particularly, to an optical disk drive having a dust removing apparatus, which minimizes the amount of dust introduced into the optical disk drive and collects dust floating inside the optical disk drive.

2. Description of Related Art

In general, an optical disk drive is a device that reproduces recorded information or records information by emitting light to a disk-shaped recording medium, such as a compact disk (CD) and a digital video disk (DVD).

FIG. 1 is a perspective view of a conventional optical disk drive, and FIG. 2 is a partial sectional view of the conventional optical disk drive shown in FIG. 1.

Referring to FIGS. 1 and 2, an optical disk drive includes a main frame 10, an upper case 70 which is coupled to an upper portion of the main frame 10, a tray 60 which carries a disk D into the disk drive, and an optical pickup 50 which records information on the disk D or reproduces information recorded on the disk D. A disk receiving surface 62 in which the disk D is received is formed on a top surface of the tray 60. A door 61 is coupled to a front end portion of the tray 60. An opening 63 through which the optical pickup 50 accesses the disk D is formed in the tray 60. A front panel 15 is coupled to a front end portion of the main frame 10. An aperture 16 through which the tray 60 passes is formed in the front panel 15.

The disk D carried by the tray 60 is mounted on a turntable 40 that is installed on an upper portion of a spindle motor 30. The turntable 40 is coupled to a rotational shaft (not shown) of the spindle motor 30 such that the turntable 40 is rotated by the rotational shaft of the spindle motor 30 to rotate the disk D. The spindle motor 30 is installed on a pickup deck 20 that is coupled to the main frame 10. Further, the optical pickup 50 is installed on the pickup deck 20 to move in a radial direction of the disk D.

As shown in FIG. 2, when the tray 60 is inserted into the disk drive, there exists a gap between the door 61 of the tray 60 and the front panel 15. Foreign substances, such as external dust, are introduced into the disk drive through the gap. The foreign substances introduced into the disk drive may contaminate the disk D when they attach to a surface of the disk D and may deteriorate the performance of the optical pickup 50 when they attach to a lens of the optical pickup 50.

BRIEF SUMMARY

Embodiments of the present invention provides an optical disk drive including a dust removing apparatus, which can minimize the amount of dust introduced into the optical disk drive and collect dust floating inside the optical disk drive.

According to an aspect of the present invention, there is provided an optical disk drive, which includes a main frame, an upper case coupled to an upper portion of the main frame, a tray slidably installed on the main frame, having a door, and adapted to carry a disk, and a front panel coupled to a front end portion of the main frame and having an aperture through which the tray passes, including an air discharging passage between the main frame and the front panel to discharge air and dust introduced into the optical disk drive through a gap between the door and the front panel to an outside of the optical disk drive.

The air discharging passage may have an inlet which is opened toward a rear surface of the door to communicate with the gap, and an outlet, which is opened toward a bottom of the optical disk drive to allow the air discharging passage to communicate with the outside of the optical disk drive.

A dust adsorbing filter may be attached to an inner wall surface of the air discharging passage and adsorb and collect dust contained in air passing through the air discharging passage. In this case, the air discharging passage may have a recessed portion formed thereon, and the dust adsorbing filter may be attached to an inner wall surface of the recessed portion.

According to another aspect of the present invention, there is provided an optical disk drive, which includes a main frame, an upper case coupled to an upper portion of the main frame, and a tray slidably installed on the main frame to carry a disk, including a plurality of projections arranged on at least a top surface of the tray to remove dust contained in air flowing inside the optical disk drive.

The projections may be arranged on a top surface of a rear end portion of the tray, or top and bottom surfaces of the rear end portion of the tray.

The projections may have a square-pillar shape, and may be integrally formed with the tray.

According to still another aspect of the present invention, there is provided an optical disk drive, which includes a main frame, an upper case coupled to an upper portion of the main frame, and a tray slidably installed on the main frame and adapted to carry a disk, the optical disk drive including a dust adsorbing filter attached to at least one of a top surface of the tray, a bottom surface of the tray, and a bottom surface of the upper case and adapted to adsorb and collect dust contained in air flowing inside the optical disk.

The dust adsorbing filter may be attached to at least a top surface or a bottom surface of a rear end portion of the tray, or the bottom surface of the upper case.

The optical disk drive may further comprise an air guide disposed on at least one of the top and bottom surfaces of the tray and the bottom surface of the upper case and adapted to guide air flowing due to the rotation of the disk toward the dust adsorbing filter.

The air guide may be disposed on at least the top surface of the top and bottom surfaces of the tray, and may be integrally formed with the tray.

The air guide may protrude from the bottom surface of the upper case by a specified height toward the tray. In this case, the air guide may be integrally formed with the upper case.

The air guide may be made of a porous filtering material.

According to another aspect of the present invention, there is provided an optical disk drive including: a frame; an upper case coupled to an upper portion of the frame; a tray slidably installed on the frame, having a door, and adapted to carry a disk; a front panel coupled to a front end portion of the frame and having an aperture through which the tray passes; an air discharging passage between the frame and the front panel to discharge to an outside of the optical disk drive air and dust introduced into the optical disk drive through a gap between the door and the front panel; and a plurality of projections arranged on at least a top surface of the tray to remove dust contained in air flowing inside the optical disk drive.

According to another aspect of the present invention, there is provided an optical disk drive including: a frame; an upper case coupled to an upper portion of the frame; a tray slidably installed on the frame, having a door, and adapted to carry a disk; a front panel coupled to a front end portion of the frame and having an aperture through which the tray passes; an air discharging passage between the frame and the front panel to discharge to an outside of the optical disk drive air and dust introduced into the optical disk drive through a gap between the door and the front panel; and a dust adsorbing filter attached to at least one of a top surface of the tray, a bottom surface of the tray, and a bottom surface of the upper case and adapted to adsorb and collect dust contained in air flowing inside the optical disk.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
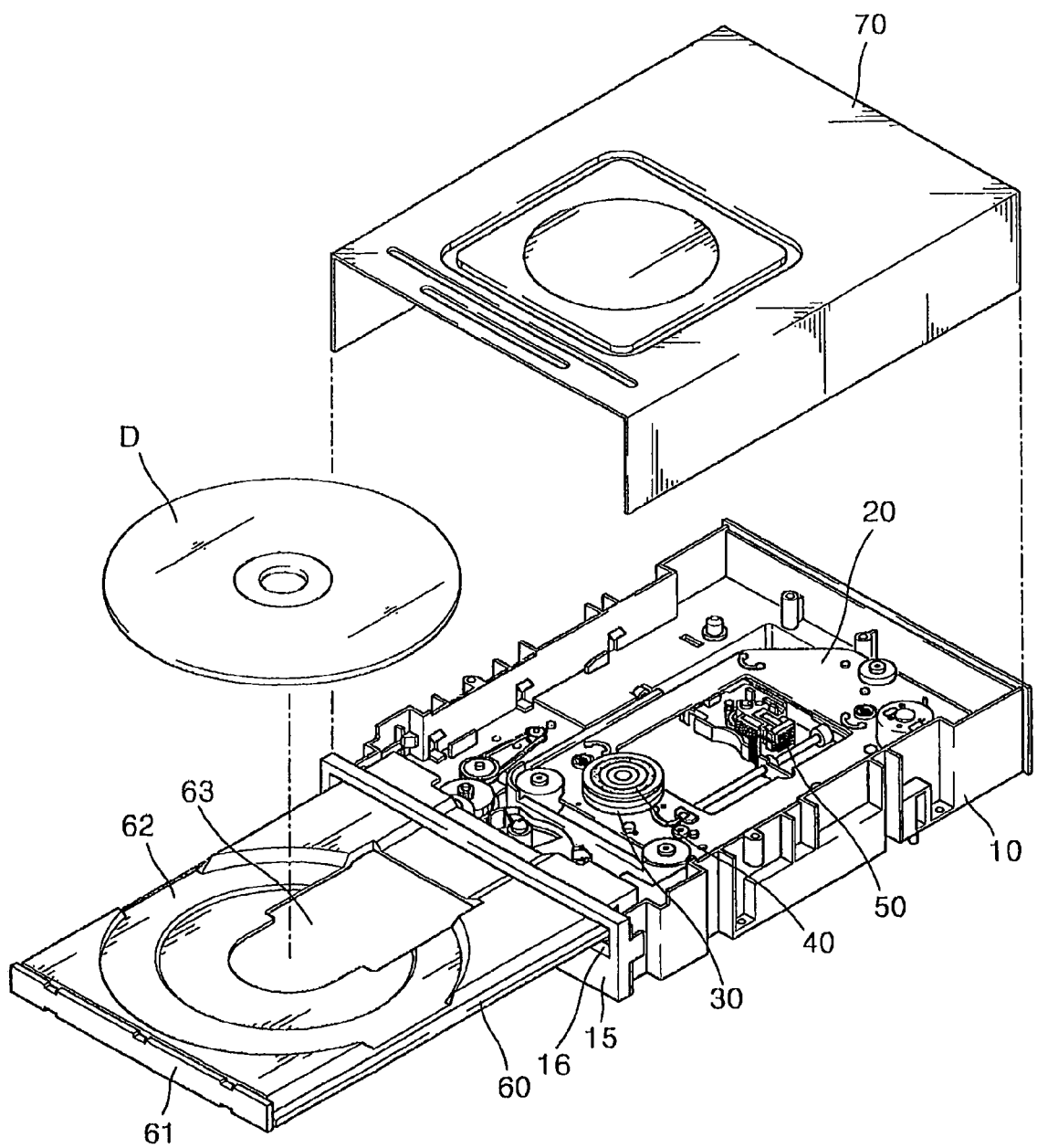
FIG. 1 is a perspective view of a conventional optical disk drive.
Figure 2:
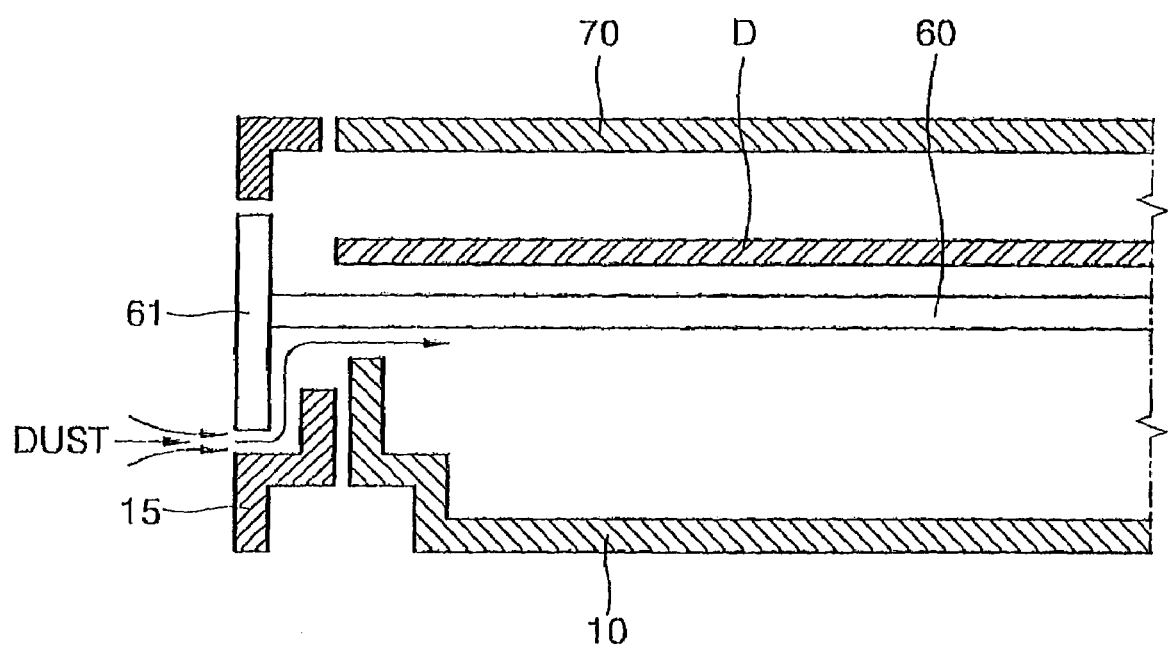
FIG. 2 is a partial sectional view of the conventional optical disk drive shown in FIG. 1.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
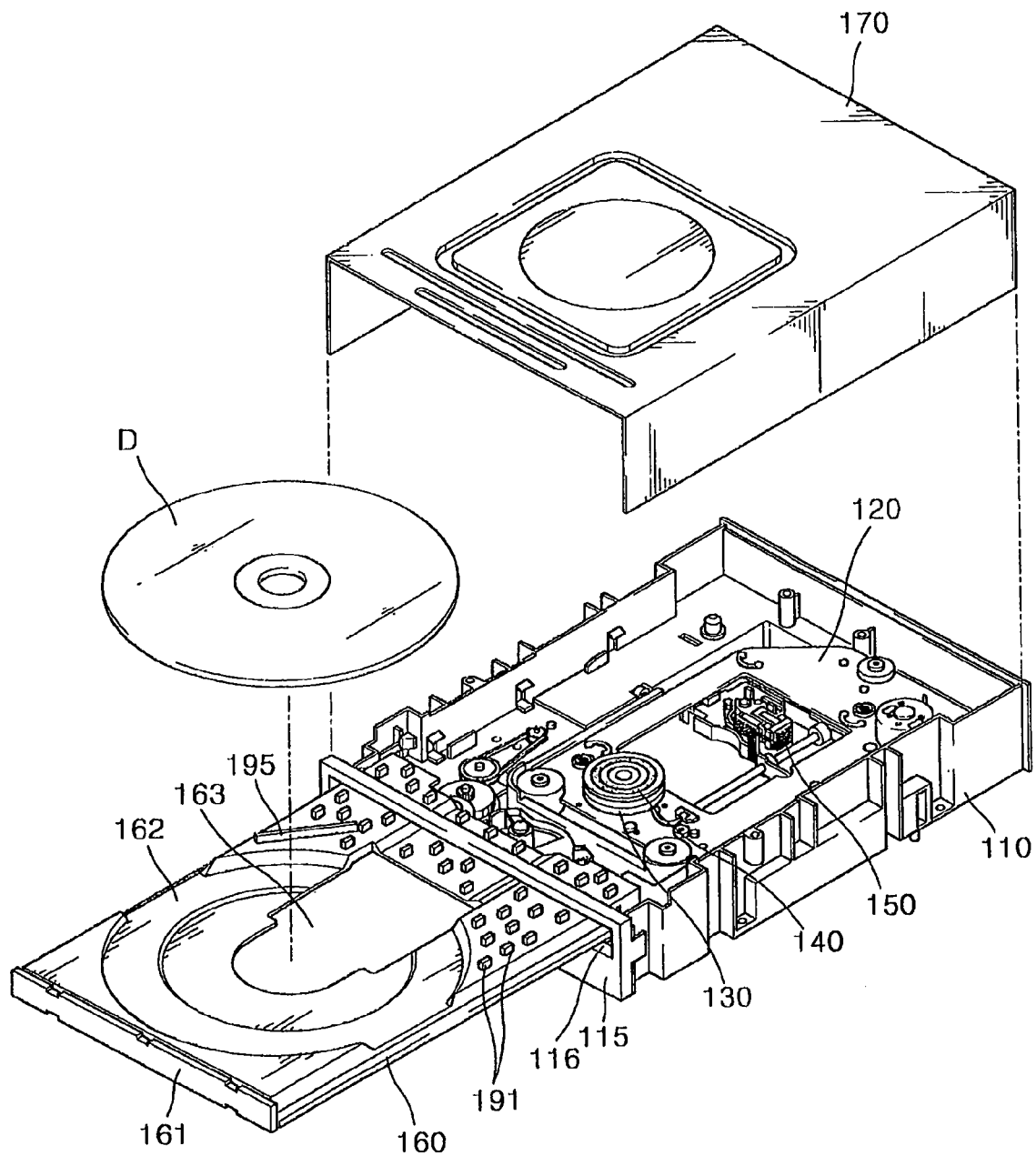
FIG. 3 is a perspective view of an optical disk drive including a dust removing apparatus according to an exemplary embodiment of the present invention.
Figure 4:
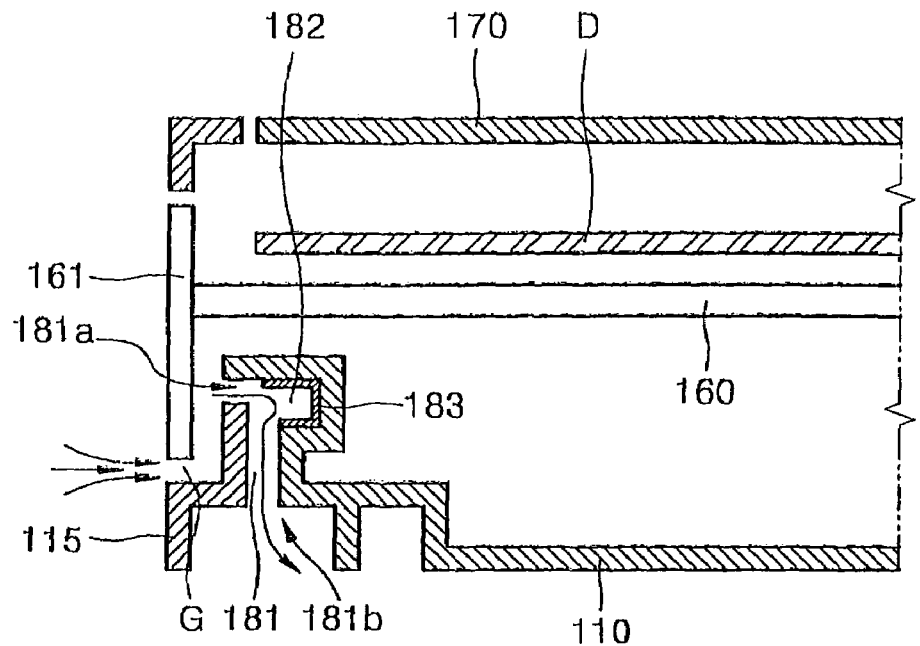
FIG. 4 is a partial sectional view of the optical disk drive shown in FIG. 3.

FIG. 3 is a perspective view of an optical disk drive comprising a dust removing apparatus according to an exemplary embodiment of the present invention, and FIG. 4 is a partial sectional view of a front end portion of the optical disk drive shown in FIG. 3.

Referring to FIGS. 3 and 4, an optical disk drive includes a main frame 110, and an upper case 170 coupled to an upper portion of the main frame 110. A tray 160 is slidably installed on the main frame 110 and carries a disk D into the disk drive. The main frame 110 is coupled to a turntable 140 on which the disk D carried by the tray 160 is mounted, a spindle motor 130 which rotates the turntable 140, and a pickup deck 120 which supports an optical pickup 150 for recording information on the disk D or reproducing information recorded on the disk D. An end portion of the pickup deck 120 is hinged on the main frame 110 so that the spindle motor 130 and the turntable 140 can be raised and lowered. The turntable 140 is coupled to a rotational shaft of the spindle motor 130 such that the turntable 140 is rotated by the rotational shaft of the spindle motor 130 to rotate the disk D. A front panel 115 is coupled to a front end portion of the main frame 110, and an aperture 116 through which the tray 160 passes is formed in the front panel 115.

According to the present embodiment, the optical disk drive is provided with a dust removing apparatus. To this end, as shown in FIG. 4, an air discharging passage 181 is formed between the main frame 110 and the front panel 115 to discharge air introduced into the optical disk drive through a gap G between a door 161 of the tray 160 and the front panel 115. An inlet 181a of the air discharging passage 181 communicates with the gap G, and an outlet 181b of the air discharging passage 181 communicates with the outside of the disk drive. In detail, the inlet 181a of the air discharging passage 181 is opened toward a rear surface of the door 161, and the outlet 181b of the air discharging passage is opened toward a bottom of the disk drive.

In the above structure, most of air introduced into the disk drive through the gap G between the door 161 of the tray 160 and the front panel 115 is discharged to the outside of the disk drive through the air discharging passage 181. At this time, since foreign substances, such as dust, contained in the air are also discharged to the outside of the disk drive through the air discharging passage 181, the amount of dust introduced into the disk drive can be minimized. Accordingly, contamination of the disk D and performance deterioration of the optical pickup 150, which may be caused due to the dust, can be prevented.

The optical disk drive is generally housed in a computer. Accordingly, the dust contained in the air discharged through the air discharging passage 181 should be prevented from entering the computer. To this end, a dust adsorbing filter 183 may be attached to an inner wall surface of the air discharging passage 181. The dust adsorbing filter 183 adsorbs and collects the dust contained in the air passing through the air discharging passage 181. The air discharging passage 181 has a recessed portion 182 formed thereon, and the dust adsorbing filter 183 may be attached to an inner wall surface of the recessed portion 182. The recessed portion 182 reduces a speed of the air passing through the air discharging passage 181 to help the dust adsorbing filter 183 to collect the dust contained in the air.

The optical disk drive including the dust removing apparatus according to the present embodiment may further include a plurality of projections 191, as shown in FIG. 3, which are arranged on a top surface of the tray 160 and remove dust contained in air flowing inside the disk drive. A disk receiving surface 162 in which the disk D is received is formed on the top surface of the tray 160, and the door 161 is coupled to a front end portion of the tray 160. Further, an opening 163 is formed in the tray 160 such that the optical pickup 150 accesses the disk D through the opening 163. Accordingly, the projections 191 can be formed on any portions of the top surface of the tray 160 other than the disk receiving surface 162 and the opening 163. The projections 191 may be formed on a portion where is relatively large, flat, and less affected by dust, e.g., on a top surface of a rear end portion of the tray 160. However, the present embodiment is not restricted thereto, but the projections 191 can be formed on a top surface of the front end portion of the tray 160.

The projections 191 may have various shapes, such as a square-pillar shape and a cylindrical shape. The square-pillar shape as shown in the drawings performs well because the projections with those shapes can form turbulence more easily, which will be explained later. The projections 191 may be as high as possible unless the projections 191 cause an interference with other elements when the tray 160 is moved into and out of the disk drive. The projections 191 do not need to be arranged regularly, but can be arranged irregularly as shown in the drawings. Further, the projections 191 may be integrally formed with the tray 160 when the tray 160 is manufactured by plastic injection molding. Meanwhile, the projections 191 may be attached as a separate member to the top surface of the tray 160.

An air guide 195 may be disposed on the top surface of the tray 160 to guide air flowing due to the rotation of the disk D toward the projections 191. The air guide 195 may have a long bar shape, and may be as high as possible unless the air guide 195 causes an interference with other elements, like the projections 191. The air guide 195 may be integrally formed with the tray 160, or may be attached as a separate member to the top surface of the tray 160, like the projections 191.

Figure 5:
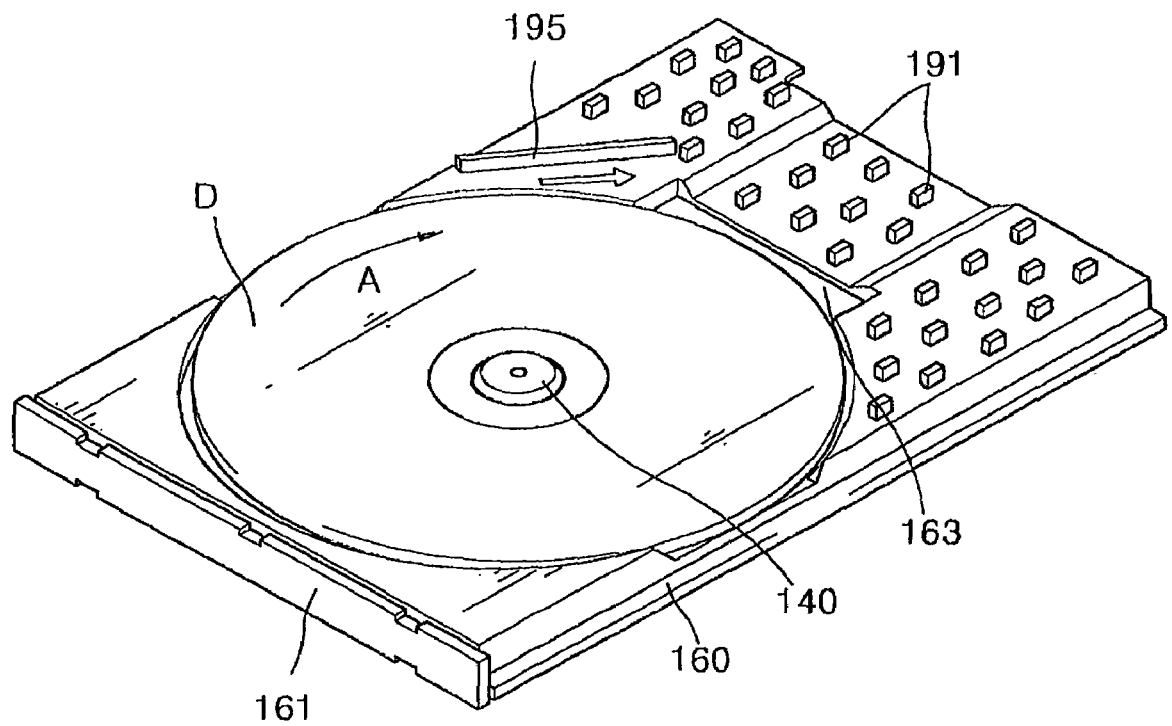
FIG. 5 is an enlarged perspective view of a tray and a disk for explaining operations of projections and an air guide shown in FIG. 3.
Figure 6:
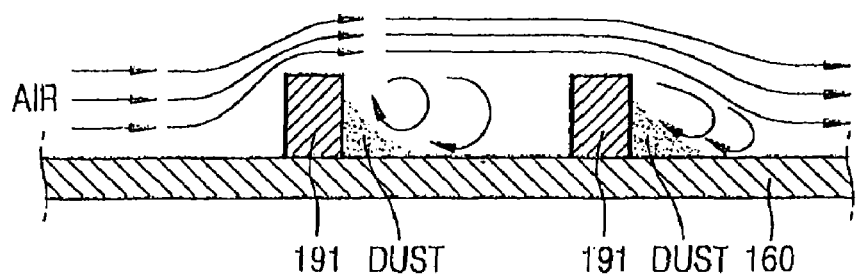
FIG. 6 is a sectional view illustrating air flow around the projections for explaining the operations of the projections and the air guide shown in FIG. 3.

FIGS. 5 and 6 are diagrams for explaining operations of the projections and the air guide shown in FIG. 3. Specifically, FIG. 5 is an enlarged perspective view of the tray and the disk, and FIG. 6 is a sectional view illustrating air flow around the projections.

Referring to FIGS. 5 and 6, if the disk D mounted on the turntable 140 begins to rotate in an arrow direction A, air begins to flow in the same direction as the rotational direction of the disk D. The flowing air is guided by the air guide 195 to pass through the area where the projections 191 are arranged. As shown in FIG. 6, while the flowing air crosses over the projections 191, turbulence is formed behind the projections 191. Foreign substances, such as dust, contained in the air are accumulated behind the projections 191 due to the turbulence. Accordingly, since the amount of dust contained in the air passing through the area where the projections 191 are arranged is reduced considerably, conventional problems of contamination of the disk D or performance deterioration of the optical pickup 150, which may be caused when the dust contained in the flowing air floats inside the disk drive, can be prevented.

Figure 7:
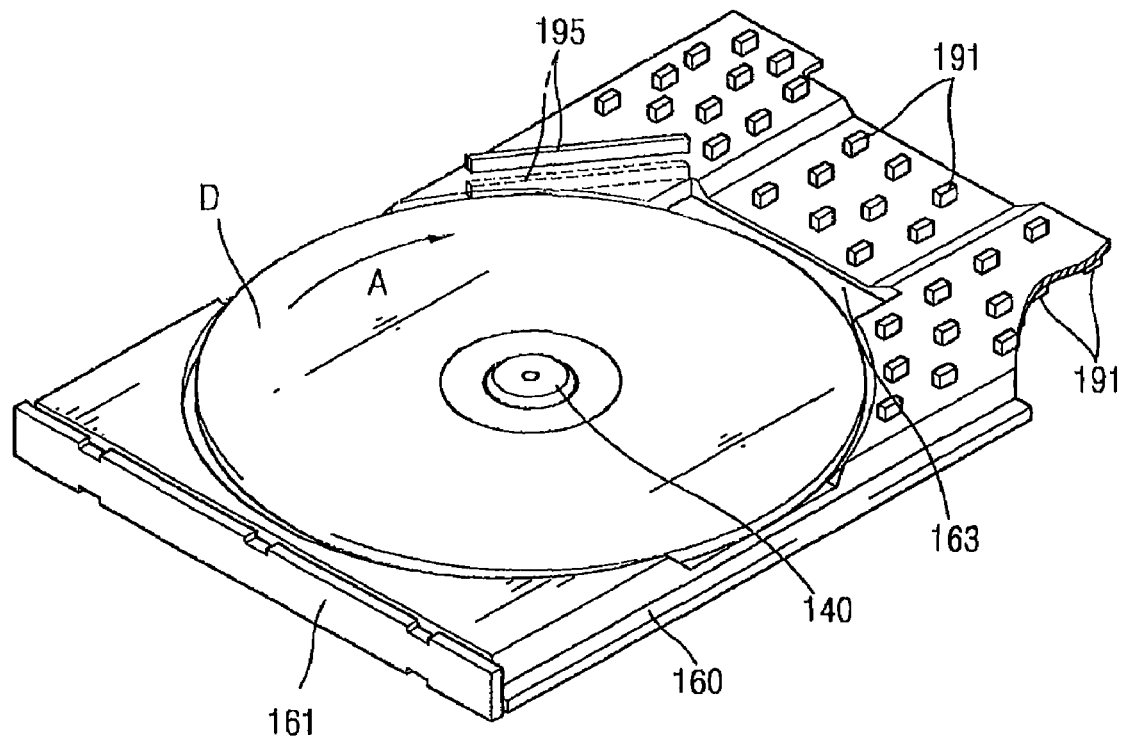
FIG. 7 is a perspective view of an example of the projections and the air guide shown in FIG. 3.

FIG. 7 is a perspective view of an example of the projections and the air guide shown in FIG. 3.

Referring to FIG. 7, the projections 191 and the air guide 195 may be disposed on a bottom surface of the tray 160 as well as the top surface of the tray 160. The projections 191 and the air guide 195 formed on the bottom surface of the tray 160 remove dust contained in air flowing under the tray 160.

Figure 8:
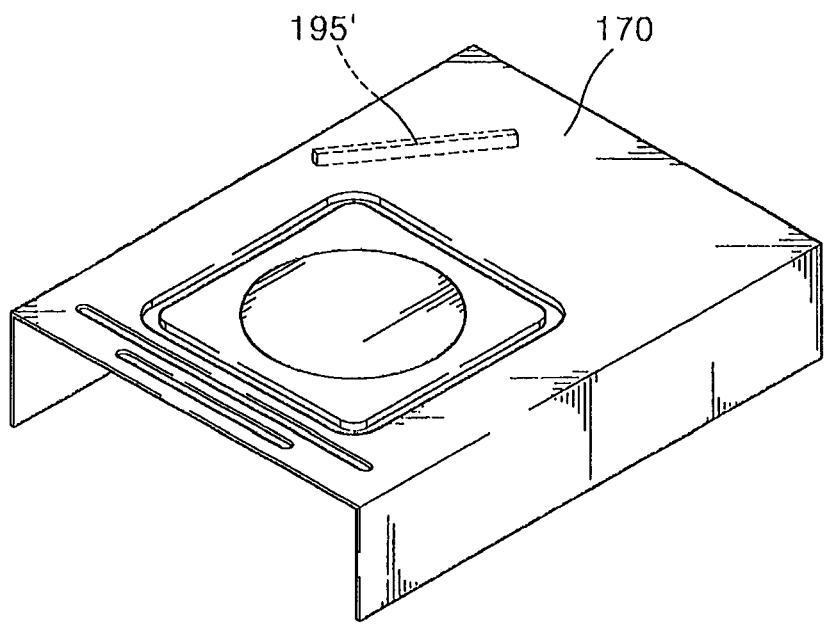
FIG. 8 is a perspective view of another example of the air guide shown in FIG. 3.

FIG. 8 is a perspective view of another example of the air guide shown in FIG. 3.

Referring to FIG. 8, an air guide 195' may be formed on the upper case 170. That is, the air guide 195' protrudes from a bottom surface of the upper case 170 by a specified height toward the tray 160. The air guide 195' guides air flowing due to the rotation of the disk D toward the projections 191 arranged on the top surface of the tray 160. The upper case 170 is generally manufactured by pressing a metal plate, such as a stainless steel plate. The air guide 195' may be integrally formed with the upper case 170 when the upper case 170 is manufactured by pressing. In the meantime, the air guide 195' may be attached as a separate member to the bottom surface of the upper case 170.

Figure 9:
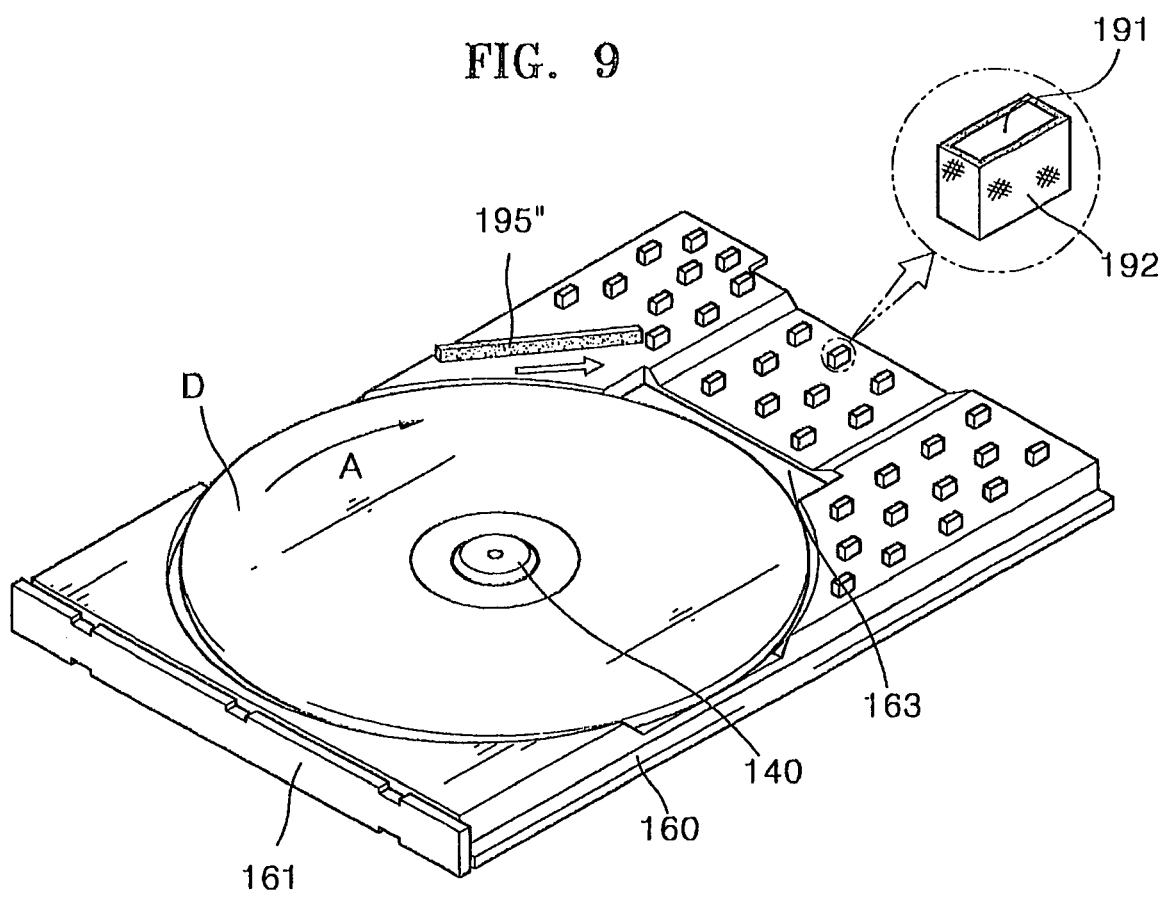
FIG. 9 is a perspective view of still another example of the projections and the air guide shown in FIG. 3.

FIG. 9 is a perspective view of still another example of the projections and the air guide shown in FIG. 3.

Referring to FIG. 9, an air guide 195" guiding flowing air toward the projections 191 may be made of a porous filtering material, such as sponge. The air guide 195" made of the filtering material may be attached to the top surface of the tray 160 using an adhesive or the like. A dust adsorbing filter 192 may be attached to a surface of each of the projections 191.

In the above structure, the air guide 195" not only guides the flowing air toward the projections 191 but also filters dust contained in the flowing air. Since the dust adsorbing filter 192 adsorbs and collects the dust contained in the flowing air as well, the efficiency in collecting and removing dust can be improved.

The example shown in FIG. 9 can be applied to the examples shown in FIGS. 7 and 8.

Figure 10:
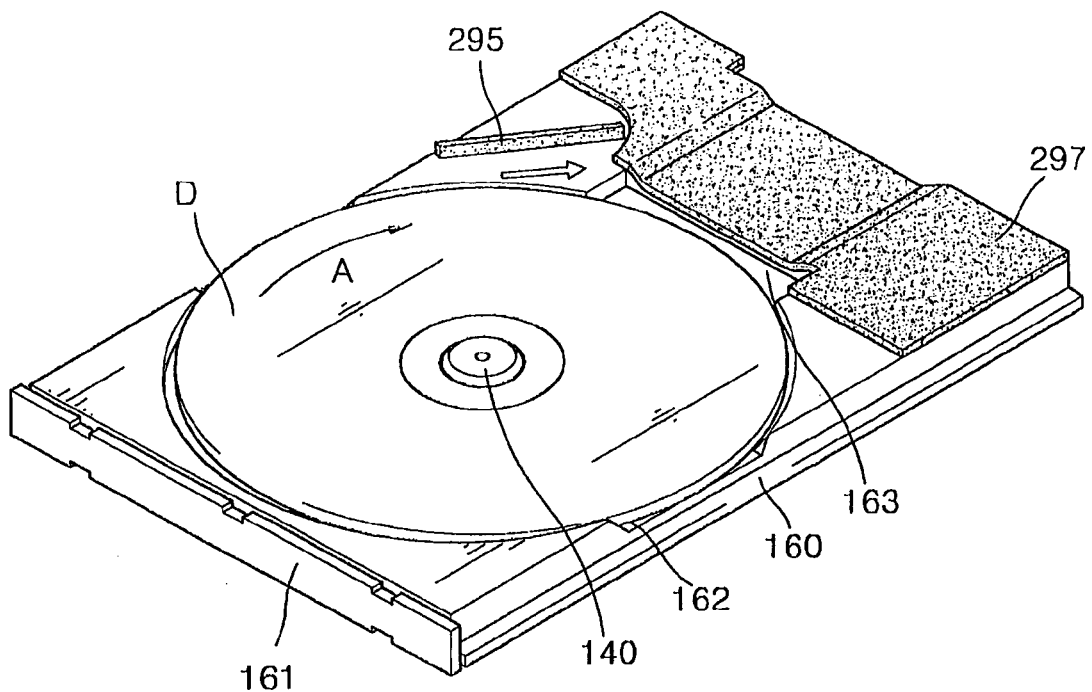
FIG. 10 is a perspective view of an optical disk drive including a dust removing apparatus according to another exemplary embodiment of the present invention.

FIG. 10 is a perspective view of an optical disk drive including a dust removing apparatus according to another embodiment of the present invention.

Referring to FIG. 10, an optical disk drive includes a dust adsorbing filter 297, which is attached to a top surface of the tray 160 and adsorbs dust contained in air flowing inside the disk drive. The dust adsorbing filter 297 can be attached to the top surface of the tray 160 using a specified adhesive. The dust adsorbing filter 297 can be disposed on any portions of the top surface of the tray 160 other than the disk receiving surface 162 and the opening 163. The dust adsorbing filter 297 may be disposed on a portion, which is relatively large, flat, and less affected by dust, e.g., a top surface of a rear end portion of the tray 160. However, the present embodiment is not restricted thereto, but the dust adsorbing filter 297 can be disposed on a top surface of a front end portion of the tray 160.

An air guide 295 may be disposed on the top surface of the tray 160 to guide air flowing due to the rotation of the disk D toward the dust adsorbing filter 297. The air guide 295 may have a long bar shape, and may be as high as possible unless the air guide 295 causes an interference with other elements. The air guide 295 may be integrally formed with the tray 160, and also may be attached as a separate member to the top surface of the tray 160. Further, the air guide 295 may be made of a porous filtering material, such as sponge, as explained above. In this case, the air guide 295 filters the dust contained in the flowing air by itself.

If the disk D mounted on the turntable 140 begins to rotate in an arrow direction A, air begins to flow in the same direction as the rotational direction of the disk D. The flowing air is guided by the air guide 295 to pass an area where the dust adsorbing filter 297 is disposed. During this procedure, the dust contained in the flowing air is adsorbed by the dust adsorbing filter 297 to be removed from the flowing air. Accordingly, the amount of dust contained in the air passing through the area where the dust adsorbing filter 297 is disposed is reduced considerably.

Figure 11:
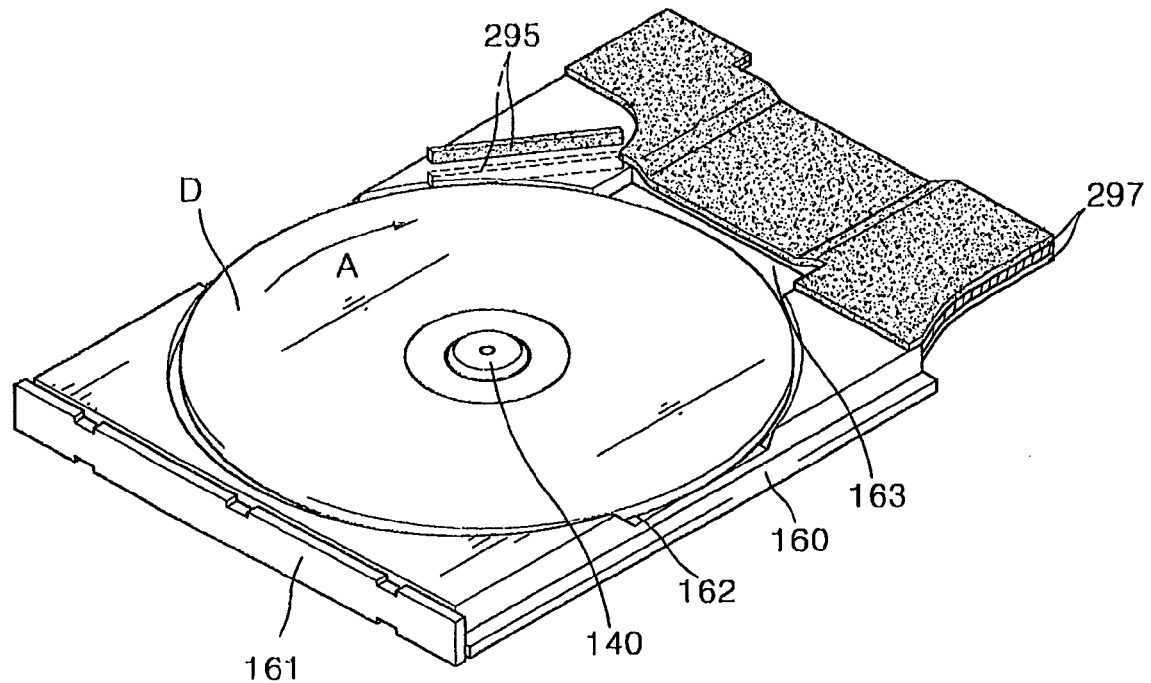
FIG. 11 is a perspective view of an example of a dust adsorbing filter and an air guide shown in FIG. 10.

FIG. 11 is a perspective view of an example of the dust adsorbing filter and the air guide shown in FIG. 10.

Referring to FIG. 11, the dust adsorbing filter 297 and the air guide 295 may be disposed on a bottom surface of the tray 160 as well as the top surface of the tray 160. The dust adsorbing filter 297 and the air guide 295 disposed on the bottom surface of the tray 160 adsorb dust contained in air flowing under the tray 160.

Figure 12:
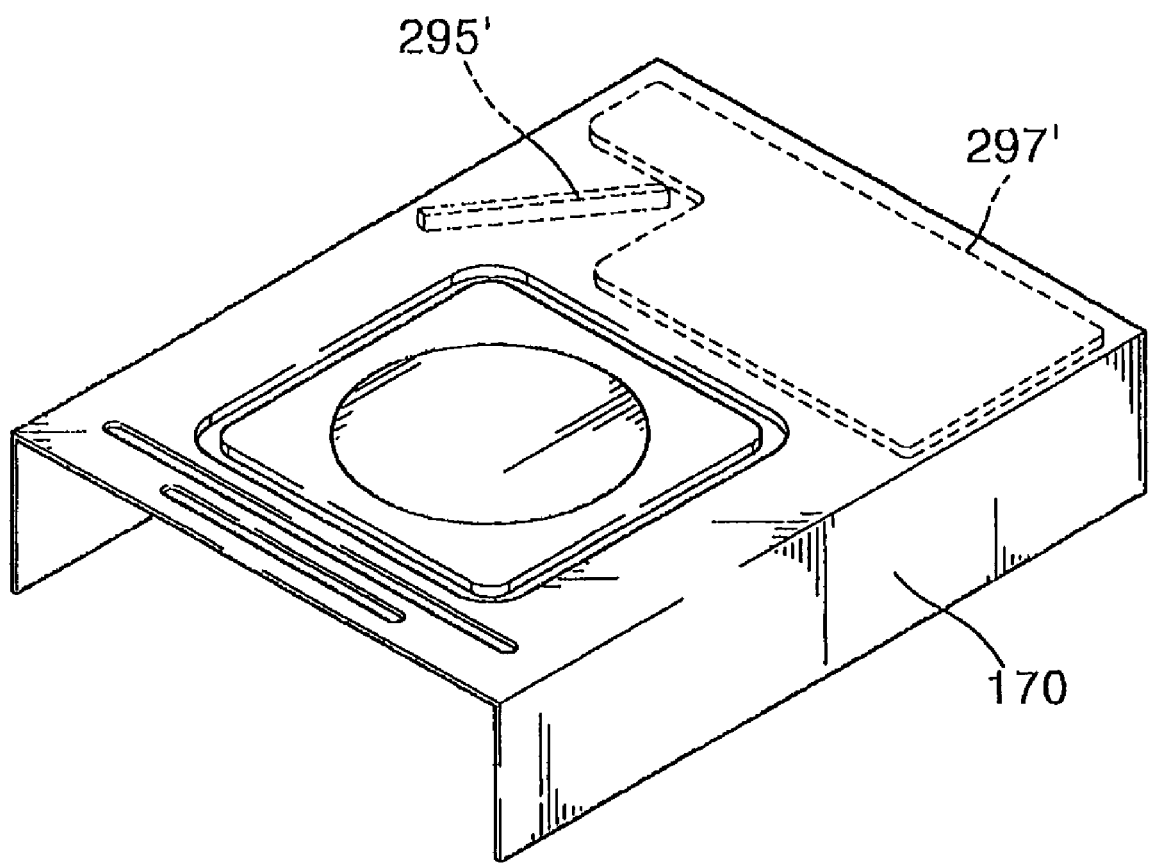
FIG. 12 is a perspective view of another example of the dust adsorbing filter and the air guide shown in FIG. 10.

FIG. 12 is a perspective view of another example of the dust adsorbing filter and the air guide shown in FIG. 10.

Referring to FIG. 12, a dust adsorbing filter 297' and an air guide 295' may be disposed on the upper case 170. That is, the dust adsorbing filter 297' is attached to a bottom surface of the upper case 170, and the air guide 295' protrudes from the bottom surface of the upper case 170 by a specified height toward the tray 160. The air guide 295' may be integrally formed with the upper case 170 when the upper case 170 is manufactured by pressing. The air guide 295' may be made of a porous filtering material, such as sponge, and in this case, the air guide 295' may be attached to the bottom surface of the upper case 170 using an adhesive.

The optical disk drive comprising the dust removing apparatus according to the described embodiments of the present invention can minimize the amount of foreign substances, such as external dust, introduced into the disk drive, and collect and remove dust floating inside the disk drive, thereby preventing the performance of the optical pickup from decreasing.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An optical disk drive, which includes a main frame, an upper case coupled to an upper portion of the main frame, a tray slidably installed on the main frame, having a door, and adapted to carry a disk, and a front panel coupled to a front end portion of the main frame and having an aperture through which the tray passes, the optical disk drive comprising:

an air discharging passage formed between the main frame and the front panel to discharge air and dust introduced into the optical disk drive through a gap between the door and the front panel to an outside of the optical disk drive, wherein a dust adsorbing filter is attached to an inner wall surface of the air discharging passage to adsorb and/or collect dust contained in air passing through the air discharging passage, and an inlet of the air discharging passage communicates with the gap and an outlet of the air discharging passage is opened toward a bottom of the optical disk drive and communicates with the outside of the optical disk drive.

2. The optical disk drive of claim 1, wherein the air discharging passage has a recessed portion formed thereon to partially increase a sectional area of the air discharging passage, and the dust adsorbing filter is attached to an inner wall surface of the recessed portion.

3. The optical disk drive of claim 2, wherein the recessed portion reduces a speed of the air passing through the air discharging passage.

* * * * *

UNITED STATES PATENT AND TRADEMARK OFFICE
CERTIFICATE OF CORRECTION

PATENT NO.       : 7,644,418 B2                                    Page 1 of 1
APPLICATION NO.  : 12/187681
DATED            : January 5, 2010
INVENTOR(S)      : Myung-ryul Choi et al.

It is certified that error appears in the above-identified patent and that said Letters Patent is hereby corrected as shown below:

On the Title Page, Item (74) (Attorney, Agent or Firm), change "Staas Halsey LLP"
    to --Staas & Halsey LLP--.

Signed and Sealed this

Thirtieth Day of March, 2010

David J. Kappos
*Director of the United States Patent and Trademark Office*